United States Patent [19]

Bennett, Jr. et al.

[11] 4,423,519
[45] Dec. 27, 1983

[54] APPARATUS AND METHOD FOR DETECTING THE ONSET OF A FREQUENCY SHIFT KEYED SIGNAL

[75] Inventors: Clarence L. Bennett, Jr., Groton; Robert Price, Lexington, both of Mass.

[73] Assignee: Sperry Corporation, New York, N.Y.

[21] Appl. No.: 340,941

[22] Filed: Jan. 20, 1982

[51] Int. Cl.³ ............................................. H03D 3/06
[52] U.S. Cl. .................................. 375/80; 324/78 F; 324/78 Q; 328/138; 329/145
[58] Field of Search .................. 324/77 F, 78 R, 78 F, 324/78 Q, 103, 133; 328/138; 329/110, 137, 145; 364/484; 375/80, 82, 88, 104; 455/212

[56] References Cited

U.S. PATENT DOCUMENTS

| | | | |
|---|---|---|---|
| 3,189,820 | 6/1965 | Lowman | 324/77 F |
| 3,636,446 | 1/1972 | Genter | 324/78 F |
| 4,072,931 | 2/1978 | Davis | 324/78 Q |
| 4,121,165 | 10/1978 | Dogliotti et al. | 329/145 |
| 4,250,453 | 2/1981 | Nilsson | 328/138 |

Primary Examiner—Benedict V. Safourek
Attorney, Agent, or Firm—Howard P. Terry

[57] ABSTRACT

An incoming signal is tested for the presence or onset of a frequency shift keyed (FSK) signal which alternates at a known rate between two unknown frequencies separated by a known frequency shift. The incoming signal is time delayed an odd multiple of the keying period and the delayed signal is multiplied by the incoming signal to produce sum and difference frequencies when the FSK signal is present. The difference frequency is selected by filtration, demodulated and integrated to produce a useable detector signal. The detector signal is compared with a threshold signal which is generated to discriminate between the FSK signal and other unwanted signals or noise in the communication channel.

50 Claims, 12 Drawing Figures

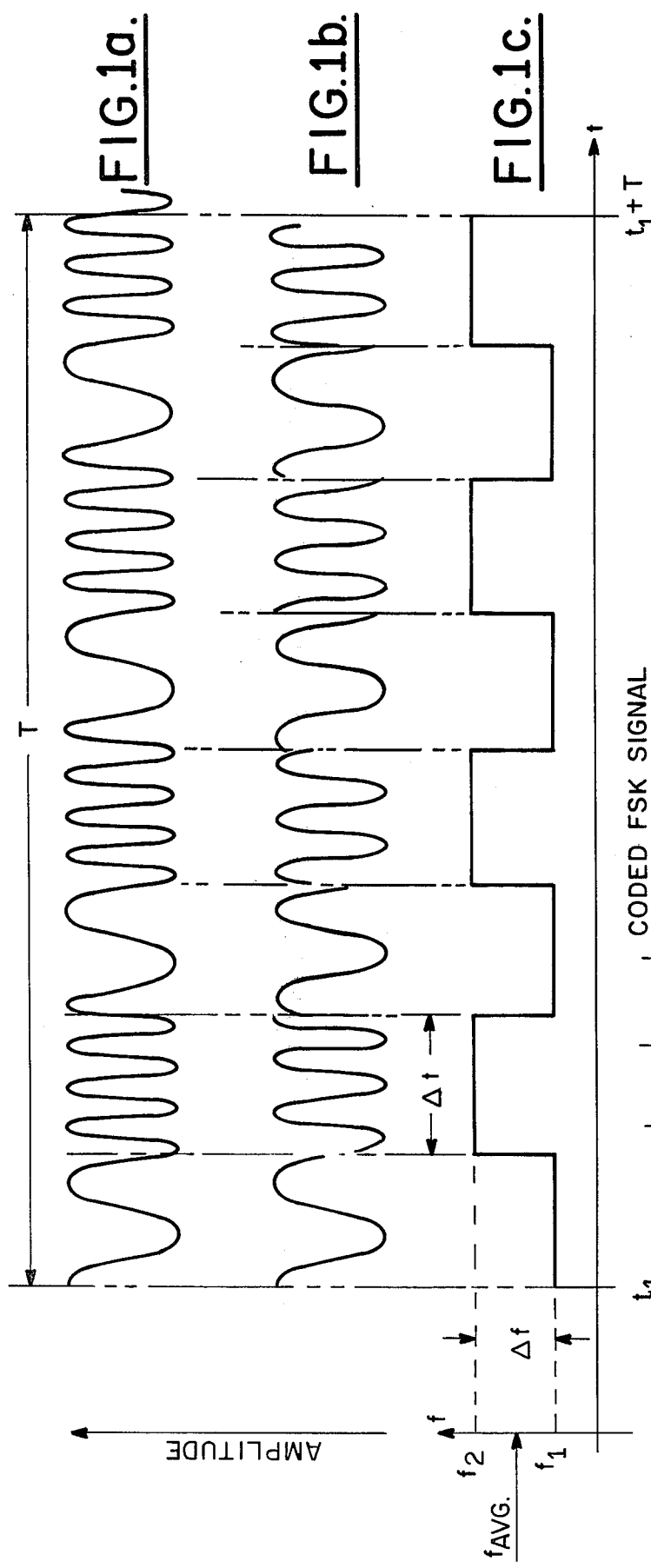
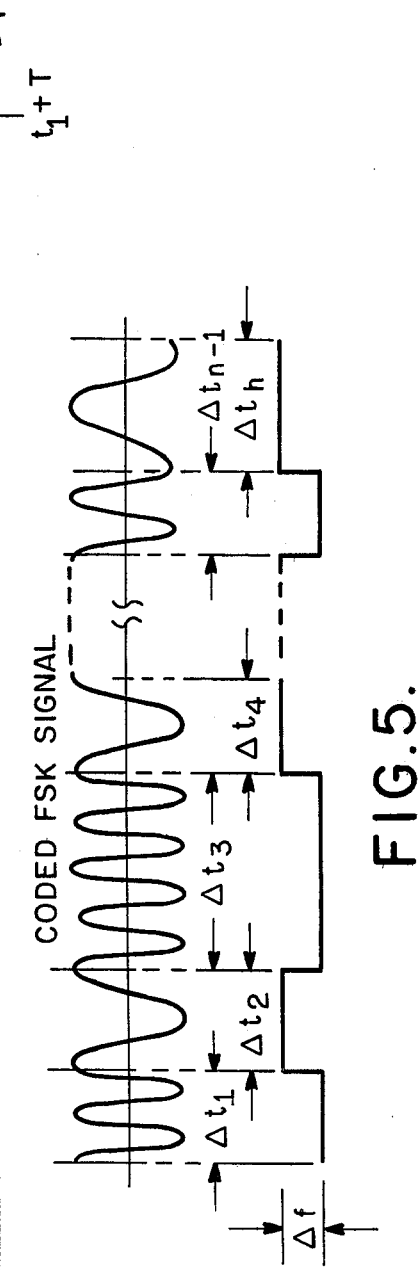

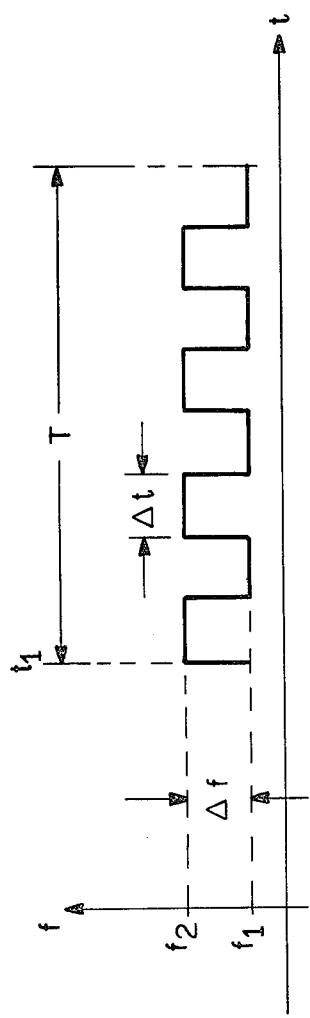
FIG.7a.
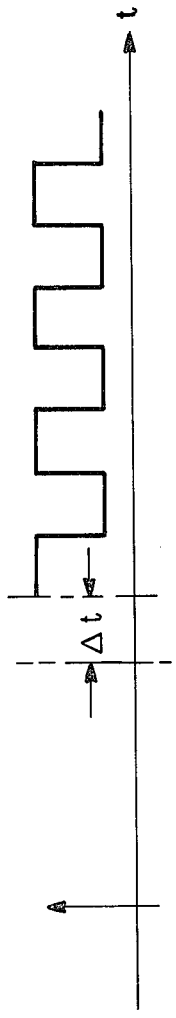
FIG.7b.
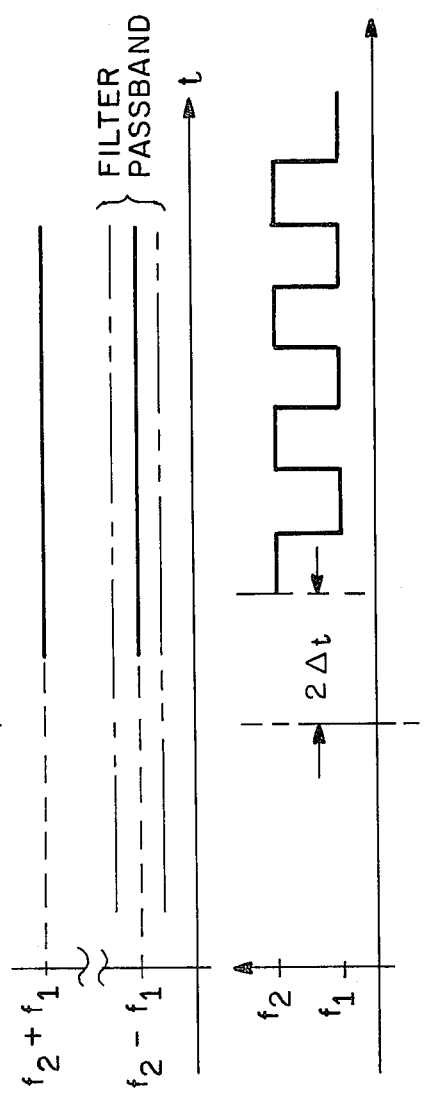
FIG.7c.
FIG.7d.

APPARATUS AND METHOD FOR DETECTING THE ONSET OF A FREQUENCY SHIFT KEYED SIGNAL

BACKGROUND OF THE INVENTION

1. Field of the Invention

This invention relates to digital communication systems, and in particular to an apparatus and method for detecting the onset or presence of a frequency shift keyed signal which alternates regularly between two unknown frequencies with a known frequency shift and a known key rate.

2. Description of the Prior Art

The frequency shift keyed (FSK) signal is one way of modulating a sine wave carrier to convey binary information in which the carrier switches or alternates between two predetermined frequencies. This may be accomplished by either frequency modulating one sine wave oscillator or by switching between two oscillators. In the latter case the two oscillators may be locked in phase in which case there is said to be phase coherence between successive pulses of each frequency; or the oscillators may not be locked in phase in which case the successive pulses of each frequency are said to be non-coherent. The two frequencies may alternate regularly at what is called the shift rate or key rate to produce a simple FSK signal. Or the frequencies may alternate irregularly to produce a coded FSK signal. In either case the alternating frequencies can be considered as deviating equally above and below an average, center, or carrier frequency with a total frequency deviation referred to herein as the frequency shift or shift frequency.

Frequency shift keyed communication signals may be used in communication systems to alert the start or end of a transmission, to synchronize remote equipment, or to transmit data. Under these circumstances detection of the onset of such an FSK signal, either by a communication receiver or by an intercept receiver, is a necessary system function.

In some situations, the transmission carrier frequency of the FSK signal may not be known at the receiver due to doppler shift, for example, or due to drift or wandering of the carrier frequency at the transmitter. Unknown carrier frequency makes the onset detection of these signals more difficult. For example, in a well known process known as synchronous detection the incoming signal, alternating between frequencies $f_1$ and $f_2$, is split into two signal paths. Each signal path is then multiplied by respective locally generated sine waves, one being the same frequency and phase as $f_1$, and the other the same as $f_2$. The resultant product terms are then passed through low pass filters to eliminate second harmonic terms. A shortcoming of the synchronous detection process is that the average carrier frequency and frequency shift, or frequencies $f_1$ and $f_2$, must be known a priori. Any drift or wandering of the carrier frequency significantly deteriorates system performance.

In another prior art detection scheme, known as non-coherent envelope detection, the incoming signal is split into two signal paths through a pair of narrow band filters, one filter centered at $f_1$ and the other filter centered at $f_2$. The outputs of the two filters are then individually envelope detected and compared to determine whether one binary symbol or the other was transmitted. Again the same shortcoming is evident. If the incoming frequencies drift or wander outside the filter pass bands, no signal will be detected.

One method has been proposed for detecting the onset of a signal of this type which takes advantage of the fact that any doppler shift or frequency wandering will equally affect both $f_1$ and $f_2$. While the carrier frequency may be unknown, the frequency shift and key rate are still known. The prior art technique uses a digital computer and the well known fast Fourier transform algorithm (FFT) to transform the incoming signal into the Fourier coefficients of its frequency spectrum. The computer then searches this spectrum for coincidences of signal which are separated by the frequency shift. One disadvantage of this system is that it requires a rather large computer and considerable memory space.

Another problem with this prior art detection scheme is encountered when the environment is noisy or when other unwanted signals are present, particularly if these unwanted signals are separated in frequency by the frequency shift. For example, the prior art detector would be unable to distinguish between the incoming frequency shift keyed signal and a pair of continuous wave (CW) signals at any two frequencies separated by the frequency shift value.

The present invention overcomes the foregoing disadvantages of the prior art and provides a highly effective detection system for frequency shift keyed signals whose carrier frequencies are unknown. The invention achieves these advantages without expensive computers or complex algorithms.

SUMMARY OF THE INVENTION

The present invention embraces a method of and apparatus for detecting a frequency shift keyed signal of known frequency shift and key rate. The invention comprises multiplying the incoming signal by a delayed version of the incoming signal, the delay being approximately an odd multiple of the key rate. This yield signals at the sum and difference frequencies which are then filtered through a bandpass filter centered at the shift frequency, and having a bandwidth approximately equal to the key rate. The bandpass filter passes only the difference frequency component which happens to be centered at the shift frequency. The filtered difference component is integrated during the expected duration of the FSK signal and demodulated or envelope detected thereafter. The envelope detected signal is then compared against a threshold signal to produce a report signal when an incoming FSK signal is present. The invention further comprises a means for producing a threshold level signal which is responsive to the communication channel environment. The threshold signal is produced by delaying the incoming signal by an even multiple of the key rate, or by a period greater than the duration of the FSK signal, and then multiplying this delayed signal by the incoming signal. The product is then filtered through a bandpass filter centered at the shift frequency and envelope detected. The envelope detected signal is then delayed by a period greater than the expected duration of the FSK signal and the resultant delayed signal is scaled to produce a certain low value for an incoming FSK signal or background noise, and a higher value for an incoming pair of CW signals. The invention is further extended in one embodiment to detect a coded FSK signal. In that embodiment the incoming signal is processed through a tapped delay line which produces a plurality of signals separated by differing time delays. Each of the plurality of signals is bandpass filtered and envelope detected according to the teachings of the invention.

For a further understanding of the invention and its advantages over the prior art, reference is made to the following detailed description and the drawings.

BRIEF DESCRIPTION OF THE DRAWINGS

FIGS. 1A–1C show a typical frequency shift keyed (FSK) waveform as might be detected by the invention.

FIG. 5 is a coded frequency shift keyed signal of the type which may be detected by the invention in one of its embodiments.

FIGS. 7A–7D are a series of waveforms useful in describing the operation of the invention.

DESCRIPTION OF THE PREFERRED EMBODIMENT

The present invention is uniquely adapted to detect the onset of a frequency shift keyed (FSK) signal. Figure 1A shows an FSK signal wherein amplitude is plotted along the abscissa and time along the ordinate. The signal alternates between a first frequency $f_1$ and a second frequency $f_2$ during regular intervals $\Delta t$ at a rate known as the key rate or shift rate, $1/\Delta t$. The frequency $f_2$ may be considered as the sum of frequency $f_1$ plus a shift frequency $\Delta f$, i.e., $\Delta f = f_2 - f_1$. This shift frequency, also referred to herein as the frequency shift, is shown more clearly in FIG. 1C, wherein frequency is plotted along the abscissa. Since the carrier frequency alternates between two distinct values, it is often convenient to refer to the average carrier frequency, $f_{avg}$, of the FSK signal, wherein $f_{avg} = f_1 + \Delta f/2$. Referring to Fig. 1A, it will be noticed that the frequencies $f_1$ and $f_2$ are phase coherent, as might be produced by two phase stable oscillators. Not all frequency shift keyed signals exhibit phase coherence. A non-coherent FSK signal is shown in FIG. 1B. For purposes of describing the invention, the FSK signal of FIG. 1 is assumed to begin at arbitrary time $t_1$ and end at time $t_1 + T$, where T represents the duration of the FSK signal. In FIG. 1, the signal comprises eight successive pulses of alternating frequencies, however, it will be understood that any number N of frequency shifts are contemplated by the invention, wherein N is defined so that $T = N\Delta t$.

Figure 2:
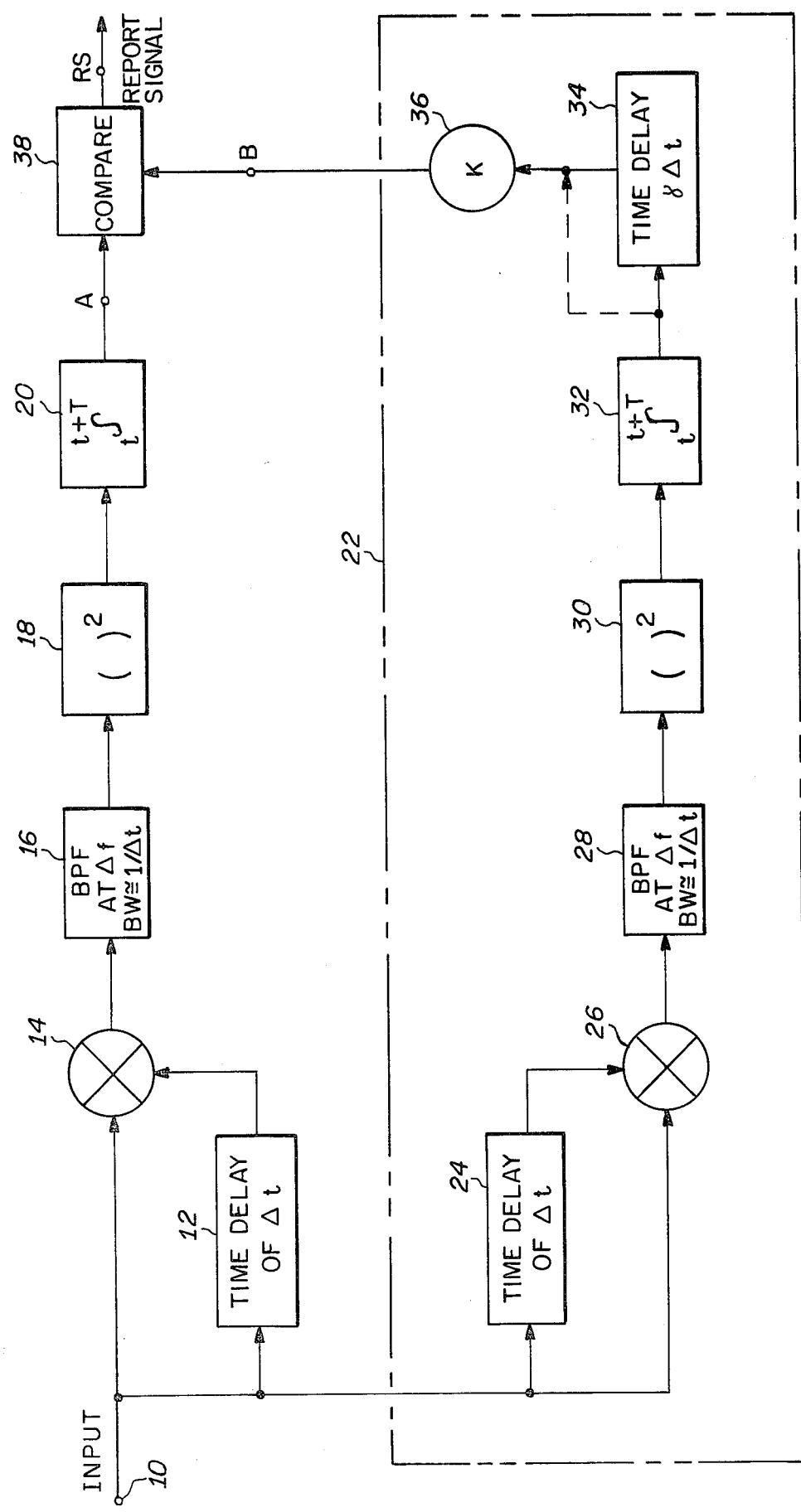
FIG. 2 is a block schematic diagram of a first embodiment of the FSK detector.

A first preferred embodiment of the invention is shown in FIG. 2. The embodiment is suitable to detect both phase coherent and non-coherent FSK signals. The embodiment comprises an input port 10 into which an incoming signal may be introduced. The incoming signal is applied to a first time delay device 12 which is adapted to delay the incoming signal by an odd multiple of the key period $\Delta t$. The time delay device 12 may be, for instance, an analog delay device, or a shift register interfaced with an A/D converter in the usual fashion. In some applications, especially at very high key rates, a surface acoustic wave (SAW) delay line may be used. In the presently preferred embodiment, the incoming signal is delayed in delay device 12 by approximately the unity multiple of the key period $\Delta t$. It will become apparent to those skilled in the art that this first delay might be any odd multiple of the key period, provided it does not exceed the duration T of the incoming FSK signal. For most applications, the unity multiple yields greatest sensitivity. The first time delay signal and the incoming signal are multiplied together in a first multiplier 14. The output product of multiplier 14 is applied to a first bandpass filter 16 having a passband centered at the shift frequency $\Delta f$. In this first preferred embodiment, the bandwidth of bandpass filter 16 is approximately equal to the key rate $1/\Delta t$. While use of a bandpass filter is presently preferred for its ability to reject noise frequencies outside the passband, it will be understood that a low pass filter adapted to pass the shift frequency $\Delta f$ might alternatively be employed. The filtered signal is then applied to an envelope detector or demodulator 18 which may be, for example, any well known non-linear device such as a square law detector. The demodulated signal is applied to an integrator 20 which integrates the demodulated signal non-coherently over the duration T of the anticipated FSK signal. The integrator 20 provides an output signal, or detector signal, for comparison to a threshold level in order to determine the presence or absence of an FSK signal.

An important aspect of the invention is the manner in which the threshold signal is produced so as to reject unwanted signals and noise in the communication channel environment. The means for producing a threshold signal 22 will now be described in conjunction with the first preferred embodiment of the invention described above. However, such threshold producing means 22 is equally applicable to the other embodiments of the invention, yet to be discussed. The threshold producing means 22 comprises a second time delay device 24, which may be of the type described in connection with first time delay device 12. The second time delay device 24 receives the incoming signal from input port 10 and delays this signal by a time $\epsilon \Delta t$, where $\epsilon$ may be any even integer, or any number greater than N, the number of frequency shifts. Recall that $T = N\Delta t$, thus the time delay $\epsilon \Delta t$ might be simply any delay greater than T, the expected duration of the FSK signal. In many applications, choosing $\epsilon = 2$ is particularly appealing since it makes direct use of the regularly alternating FSK signal characteristics, regardless of the value of N, as will be demonstrated. This second time delayed signal is multiplied by the incoming signal in a second multiplier 26 and the product is applied to a second bandpass filter 28. Like the first bandpass filter 16, the second bandpass filter has a passband centered at $\Delta f$ and a bandwidth approximately equal to $1/\Delta t$. The filtered signal is then applied to a second envelope detector or demodulator 30 and integrated non-coherently over the period T in a second integrator 32. In one embodiment of the threshold producing means 22, the output of second integrator 32 is applied to a third time delay device 34. The third time delay device 34 is adapted to delay the applied signal by a time $\gamma \Delta t$, where $\gamma$ is a number greater than N. This third delay makes the threshold producing means less responsive to transient signals, and in particular to the onset of the FSK signal. The delayed signal from third time delay device 34 is then applied to a scaling device 36 for adjusting the level of the threshold signal to be compatible with the detector signal of first integrator 20. In a second embodiment of the threshold producing means 22 the third time delay device 34 may be omitted and the output of second integrator 32 is connected directly to scaling device 36, as shown in dotted lines. This second threshold embodiment may be used, for example, where a simpler circuit is desired and where transient signal interference with the threshold is not a pressing problem. As will be discussed in greater detail, the threshold producing means 22 produces a threshold signal whose amplitude changes according to the communication channel environment.

The invention further comprises a comparator 38 having a detector input port A and a threshold input port B, and having an output port RS for providing a report signal when an FSK signal is detected. The detector signal of first integrator 20 is applied to detector port A and the threshold signal of threshold producing means 22 is applied to threshold port B. The comparator 38, which may be described with the aid of the following Truth Table, produces a report signal when the incoming signal includes the FSK signal, but does not respond to a pair of CW signals separated by the FSK shift frequency.

TABLE I

| Threshold Comparator Truth Table | | | |
|---|---|---|---|
| INPUT 10 | A | B | RS |
| Background Noise | $0^-$ | 0 | 0 |
| FSK Signal | $1^-$ | 0 | 1 |
| CW Pair | $1^-$ | 1 | 0 |
| FSK + CW | $1^+$ | 1 | 1 |

The above Table shows the states of cooperation between detector signal (A), threshold signal (B), and comparator report signal (RS) for various incoming signals ranging from background noise to a combined FSK and unwanted CW pair. The comparator 38 compares the detector signal (A) with the threshold signal (B) to produce a logical low state 0 when the detector signal is below the threshold and to produce a logical high state 1 when the detector signal is above the threshold. Referring to Table I., note that for an input of background noise, the threshold (B) is at a low state 0 and the detector (A) is at an even lower state $0^-$ as indicated by the superscript minus (−). The scaling device 36 assures that the detector state is lower than the threshold state in this instance. For an FSK signal input, with background noise assumed, the detector (A) is at an intermediate high state $1^-$, greater than the threshold state 0 but less than the threshold state 1, for reasons that will be explained in the operation description. The threshold (B) remains at state 0 for this input condition. For the case of an input signal comprising a pair of CW frequencies separated by the shift frequency $\Delta f$, the threshold (B) assumes a high state 1. The detector (A) likewise assumes its high state $1^-$, essentially the same as in response to an FSK signal. Again, the scaling device 36 assures that the detector state is lower than the threshold state. The final case shown in Table I is where an FSK signal and a pair of CW signals are combined at the input. In this case, the detector (A) is higher than before, as will be explained. This higher detector state is denoted as $1^+$ to indicate that it is greater than the threshold (B) state which remains at 1. The comparator 38 may be any logic circuit or microprocessor capable of operating according to Truth Table I. In this regard, it will be appreciated that much, if not all, of the invention might be embodied in a microprocessor programmed to perform the steps shown schematically in block diagram and described above.

Figure 3:
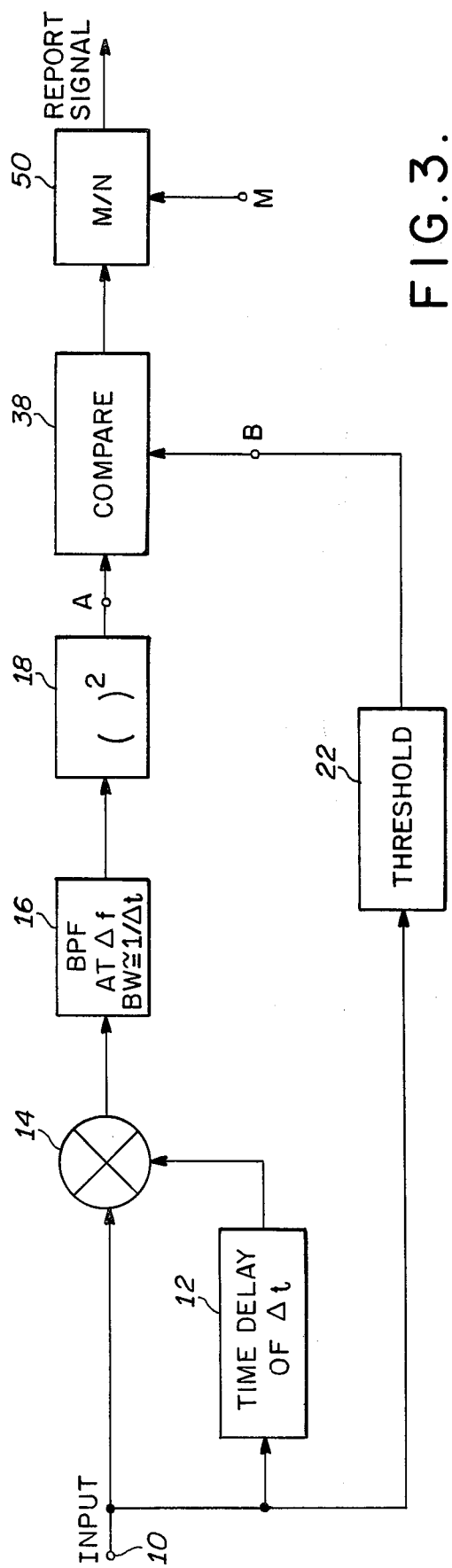
FIG. 3 is a block schematic diagram of a second embodiment of the invention.

An alternative embodiment of the invention is shown in FIG. 3. The embodiment, like the first embodiment, comprises an input port 10, and a first time delay device 12 for delaying the incoming signal by an odd multiple of the key period $\Delta t$. As in the first embodiment, the time delayed signal is multiplied by the incoming signal in a first multiplier 14, and the product is filtered through a bandpass filter 16 centered at $\Delta f$, with a bandwidth of $1/\Delta t$. The filtered signal is then processed through an envelope detector or demodulator 18, as before. Similarly, the threshold producing means 22 is provided as previously discussed. This second alternative embodiment differs from the first embodiment in that the envelope detected signal from demodulator 18 is applied directly to port A of comparator 38, without first being integrated. The output of comparator 38 is applied to an M out of N detector 50. The M out of N detector 50 performs binary integration by counting the number of times the detector level crosses the threshold during the time interval $T=(N/t)$. If the count exceeds a predetermined number M, a report signal is generated. Where the closer M is set to N, the stricter is the adherence to regular FSK alternation required for a report signal.

Figure 4:
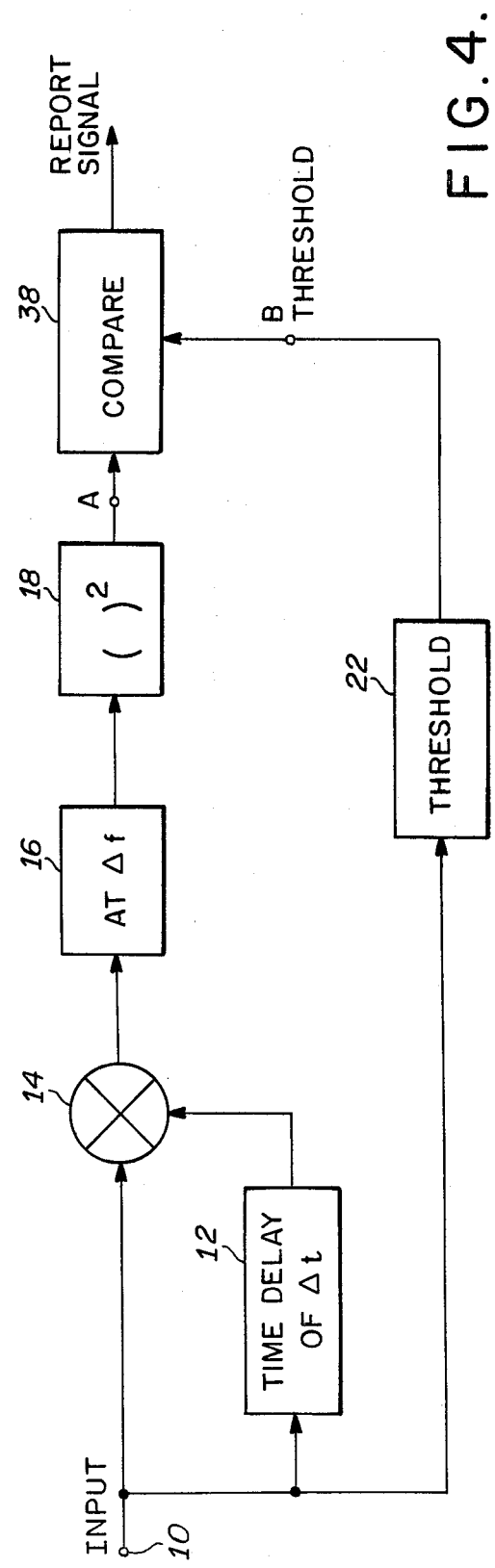
FIG. 4 is a block schematic diagram of a third embodiment of the invention.

A third alternative embodiment is adapted to give improved results when the FSK signal exhibits phase coherence between successive pulses of each frequency. For the case where $\Delta t$ can be selected such that $(f_1+f_2)\Delta t=$integer, this third embodiment can provide substantial advantage. The third alternative embodiment, shown in Fig. 4, is essentially the same as the first embodiment of FIG. 2. One difference is that the bandpass filter 16, while still centered at $\Delta f$, as a bandwidth of $1/T$. Since $T=N\Delta t$, it will be seen that the bandpass filter in the third alternative embodiment has a much narrower bandwidth than that of the first embodiment. This results in an improved signal-to-noise ratio. Another advantage of the third alternative embodiment is that the bandpass filter is capable of providing the integration function, and therefore the envelope detected signal from the modulator 18 may be applied directly to the comparator 38, without the intermediary integration step. Accordingly, the integrator has been eliminated in FIG. 4.

Figure 6:
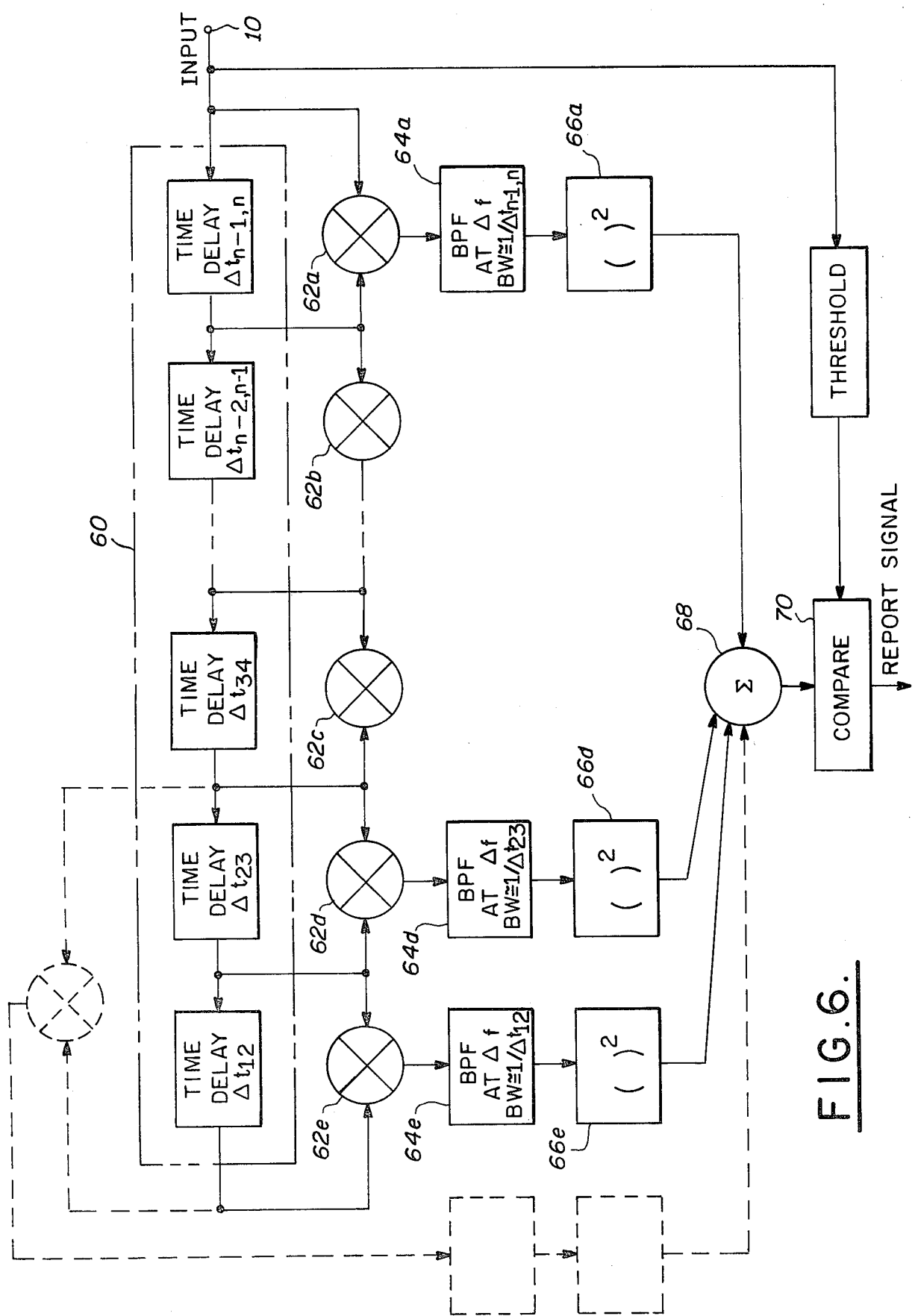
FIG. 6 is a block schematic diagram of a fourth embodiment of the invention which is capable of detecting the coded FSK signal of FIG. 5.

A fourth embodiment of the invention is adapted to detect coded FSK signals, such as the signal shown in FIG. 5, in which frequency alternates in a known sequence of successive intervals $\Delta t_1, \Delta t_2,...\Delta t_n$. The intervals need not be of equal length. The fourth embodiment, shown in FIG. 6, comprises a tapped delay line 60 which receives the incoming signal at input port 10 and sequentially delays the incoming signal by a plurality of successive time delays to produce a plurality of time delayed signals. The tapped delay line is configured to produce successive time delays corresponding to the sequence of successive intervals of the coded FSK signal. Each successive time delay equals the minimum value of successive pairs of intervals in the coded sequence, e.g., $(\Delta t_1, \Delta t_2), (\Delta t_2, \Delta t_3)...(\Delta t_{n-1}, \Delta t_n)$. In FIG. 6, notation of the form $\Delta t_{ij}$ is used to denote this minimum value, thus $\Delta t_{12}$ represents an interval equal to $\Delta t_1$ or $\Delta t_2$, whichever is the lesser. The tapped delay line is further configured so that successive time delays are produced serially beginning with the last pair of intervals in the coded sequence. In other words, the incoming signal is applied to input port 10 and then delayed to produce a first delayed signal, the delay being equal to $\Delta t_{n-1}$ or $\Delta t_n$, whichever is the lesser. The incoming signal is then delayed to produce at least a second delayed signal, the delay being the lesser of $\Delta t_{n-2}$ or $\Delta t_{n-1}$. Thus it will be seen that the successive time delays correspond in retrograde seriatim to the sequence of successive intervals in the coded FSK signal. A plurality of multipliers 62a-e receives the plurality of time delayed signals in a ladder network arranged to produce the product of adjacent pairs of delayed signals. The output of each multiplier 62 is applied to one of a plurality of bandpass filters 64a-e whose passbands are all centered at the shift frequency $\Delta f$. Each bandpass filter has a bandwidth equal to the reciprocal of each corresponding time delay $1/\Delta t_{ij}$. Each filtered signal is applied to a corresponding envelope detector or demodulator 66a-e combined in a summer 68, and compared against a threshold in a comparator 70. The threshold is provided by a threshold producing means 72 which is responsive to the input port 10 and adapts to the communication channel environment as discussed above. It will also be appreciated that non-adjacent taps of delay line 60, such as the taps between $\Delta t_{12}$ and $\Delta t_{34}$, might be multiplied together and processed according to the invention, as shown in dotted lines in FIG. 6. This would improve detectability, as generally the greater the number of permuted tests on the incoming signal, the less likelihood for error.

FIG. 6 shows only one threshold producing means serving the plurality of detector signals. This is usually appropriate since the environment remains relatively unchanging over the duration of the coded FSK sequence. Those skilled in the art will recognize that each of the plurality of detector modules could be furnished with its own threshold producing means if the application warrants.

OPERATION

For an understanding of the operation of the invention, refer to FIGS. 7A-7D of the drawings. To demonstrate the operation, a regularly alternating FSK signal will be considered first alone and then in the presence of a CW pair separated by the shift frequency. In a later example, a coded FSK signal will be considered. As with any communication system, a certain level of noise is assumed present, although this noise is not being shown on the waveforms of FIG. 7.

An incoming FSK signal beginning at time $t_1$ and ending at time $t_1 + T$ is shown in FIG. 7A. The incoming FSK signal of FIG. 7A is applied to the first time delay device 12 which time delays the waveform by a period $\Delta t$. The shifted waveform, shown in FIG. 7B is multiplied by the incoming waveforms to produce the sum and difference frequencies shown in FIG. 7C. In this regard, recall the trigonometric identity $(\cos f_1)(\cos f_2) = \frac{1}{2} \cos(f_2 - f_1) + \frac{1}{2} \cos(f_2 + f_1)$. Also recall that the difference frequency $(f_2 - f_1)$ is, in fact, the shift frequency $\Delta f$. Because the bandpass filter 16 is centered at $\Delta f$, this difference frequency is passed through the filter, whereas the sum frequency $(f_2 + f_1)$ is rejected. Also rejected is a great deal of noise at frequencies outside the filter passband. The filtered difference frequency is a sequence of sinusoidal pulses, all at the frequency $\Delta f$ and of duration $\Delta t$, but shifting in phase from pulse to pulse. Envelope detecting in demodulator 18 removes the phase alternation to produce a logical high signal when the FSK signal is present, and a logical low signal otherwise.

Meanwhile the same input signal is applied to the threshold producing means 22. For an understanding of how the threshold signal is derived, consider the case in which the second time delay device 24 is adapted to produce a time delay of $2\Delta t$ ($\epsilon = 2$). Before time $t_1$, the input signal consists solely of background noise at a random selection of frequencies. Very little of this signal energy will pass through the second bandpass filter 28, and thus the threshold signal will have a relatively low power level. At time $t_1$, the FSK signal begins. FIG. 7D shows this FSK signal delayed by the interval $2\Delta t$. It will be seen that the phase relationship between the signal of FIGS. 7A and 7D is such that the product of these two signals amounts to the product of $f_1 \times f_1$ and $f_2 \times f_2$. In other words, the product produces frequencies at d.c. and twice $f_1$ and $f_2$, being governed by the trigonometric identity $(\cos \alpha)(\cos \alpha)$ again $= \frac{1}{2}(1 + \cos 2\Delta)$. These doubled frequencies are not passed through bandpass filter 28, and therefore the threshold level remains low.

Referring to Table I, it will be seen that before time $t_1$, when the incoming signal comprises only background noise, the detector level (A) is below the threshold level (B). In this condition, no report signal (RS) is provided. At the time $t_1$, the detector signal rises to a logical high state due to the presence of an FSK signal. The threshold state remains low, however, because it is relatively unresponsive to an FSK signal. Thus, a report signal (RS) is provided. In the example presented thus far, it will be seen that the threshold signal is a measure of the background noise present in the environment. Thus, the scaling device 36 may be set to provide a reliable report signal with the maximum sensitivity.

When the input signal environment contains a pair of continuous wave (CW) signals at any two frequencies separated by the shift frequency, a different threshold level is provided. It will be seen that such a pair of CW frequencies will produce essentially the same detector signal as does an FSK signal. In the threshold producing means, however, the CW pair is not rejected as the FSK signal was rejected in the first example. The threshold, therefore, rises to a higher level dependent upon the energy of the CW frequencies. Because the threshold signal is scaled higher than the detector signal, the circuit will select or distinguish an FSK signal from the CW pair. When the FSK signal is added to the CW pair the threshold remains at the high level. The detector signal will rise above its former high state since it represents the cumulative energy of the FSK signal and the CW pair. Thus it will be seen that the discrimination between the presence and absence of an FSK signal may be done on a relative power basis. Operating in the presence of a CW pair, it will be seen that the sensitivity is somewhat reduced since the FSK signal must have greater energy than the CW pair in order to be detected.

As a final example, consider the detection of a coded FSK signal, such as the signal shown in FIG. 5. The fourth embodiment of the invention, shown in FIG. 6, is particularly adapted for detecting such a signal. When the coded FSK signal of FIG. 5 is applied to the input port 10, it is delayed by the interval $\Delta t_{n-1}$. The delay $\Delta t_{n-1}$ is chosen because, as shown in FIG. 5, it is less than the interval $\Delta t_n$. This delayed signal is multiplied by the incoming signal in multiplier 62a to produce sum and difference frequencies as explained earlier. The sum and difference frequencies are filtered through bandpass filter 64a which passes the difference frequency and rejects the sum frequency. The difference frequency is envelope detected in demodulator 66a and applied to summer 68. Meanwhile, the incoming signal progresses down the delay line 60 where it is further delayed by successive intervals. For instance, at the penultimate tap, designated as time delay $\Delta t_{23}$ in FIG. 6, the signal is delayed an interval equal to $\Delta t_2$, which is the lesser of $\Delta t_2$ and $\Delta t_3$. This delayed signal is then multiplied by the previously delayed signal, filtered through bandpass filter 64d, and envelope detected before being applied to summer 68. Those skilled in the art will recognize that the time delays imparted by delay line 60 assure that sum and difference frequencies will be produced in the multipliers 62a-e when a properly coded FSK signal is applied at the input.

It will be understood that in each of the foregoing embodiments of the invention the input signal 10 may be prefiltered to eliminate those frequencies known not to contain the desired FSK signal. In this manner the effects of extraneous signals, interference, or noise may be suppressed.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. The method of detecting the presence in an incoming signal of a frequency shift keyed signal of known shift frequency, key rate, and key period that comprises
   (a) time delaying the incoming signal by a first time interval;
   (b) multiplying the incoming signal by the time delayed signal to produce a first product;
   (c) filtering the first product to pass a first filtered signal of frequency substantially equal to the shift frequency;
   (d) producing a threshold signal in response to the incoming signal;
   (e) producing a report signal when the first filtered signal exceeds the threshold signal.

2. The method according to claim 1 wherein the first time interval is an odd multiple of the key period.

3. The method according to claim 1 wherein the step of filtering the first product comprises filtering the first product through a bandpass filter having a pass band centered substantially at the shift frequency.

4. The method according to claim 1 wherein the step of filtering the first product comprises filtering the first product through a bandpass filter whose pass band is substantially of width equal to the key rate.

5. The method according to claim 1 that further comprises producing an integrated signal in response to the incoming signal.

6. The method according to claim 1 that further comprises demodulating the first filtered signal to produce a first demodulated signal.

7. The method according to claim 6 wherein the demodulating step is performed by envelope detecting the first filtered signal.

8. The method for detecting a coherent frequency shift keyed signal of a known finite duration, as recited in claim 1, wherein the step of filtering the first product comprises filtering the first product through a bandpass filter whose pass band is a width substantially equal to the reciprocal of the finite duration.

9. The method for detecting a frequency shift keyed signal of a known finite duration, as recited in claim 1, that further comprises integrating the first filtered signal over an interval substantially equal to the finite duration.

10. The method according to claim 1 wherein the step of producing a threshold signal is performed by
    (a) time delaying the incoming signal by a second time interval;
    (b) multiplying the incoming signal by the second time delayed signal to produce a second product;
    (c) filtering the second product to pass a second filtered signal of frequency substantially equal to the shift frequency;
    (d) providing a threshold signal in response to the second filtered signal.

11. The method according to claim 10 comprising the additional step of time delaying the second filtered signal by a third time interval.

12. A method for detecting a frequency shift keyed signal of a known finite duration, according to claim 11, wherein the third time interval is greater than the finite duration.

13. The method according to claim 10 wherein said second time interval is an even multiple of the key period.

14. The method according to claim 10 wherein the step of filtering the second product comprises filtering the second product through a bandpass filter having a pass band centered at the shift frequency.

15. The method according to claim 10 wherein the step of filtering the second product comprises filtering the second product through a bandpass filter whose pass band is substantially of width equal to the key rate.

16. The method according to claim 10 that further comprises producing an integrated signal in response to the incoming signal.

17. The method according to claim 10 that further comprises demodulating the second filtered signal.

18. The method according to claim 17 wherein the step of demodulating the second filtered signal is performed by envelope detecting the second filtered signal.

19. The method for detecting a frequency shift keyed signal of a known finite duration, according to claim 10, that further comprises integrating the second filtered signal over an interval substantially equal to the finite duration.

20. The method for detecting a coherent frequency shift keyed signal of a known finite duration, according to claim 10, wherein the step of filtering the second product is performed by filtering the second product through a bandpass filter whose pass band is a width substantially equal to the reciprocal of the finite duration.

21. A method for detecting a frequency shift keyed signal of a known finite duration according to claim 10 wherein the second time interval is greater than the finite duration.

22. A method for detecting the presence of a frequency shift keyed signal in an incoming signal which includes an intermittent pair of continuous wave signals separated in frequency by the frequency shift, according to claim 1, wherein the step of producing a threshold signal comprises producing a binary threshold signal having a first state when the incoming signal does not include the pair of continuous wave signals, and having a second state when the incoming signal includes the pair of continuous wave signals.

23. The method according to claim 1 comprising the additional step of comparing the first filtered signal with the threshold signal to produce a comparison signal and performing binary integration on the comparison signal.

24. A method of detecting the presence in an incoming signal of a coded frequency shift keyed signal having a known shift frequency and alternating in a known sequence of successive intervals that comprises
    (a) sequentially delaying the incoming signal by a plurality of successive time delays to produce a plurality of time delayed signals, including a first delayed signal and a second delayed signal;
    (b) multiplying the first delayed signal by the second delayed signal to produce a third signal;
    (c) producing a fourth signal from the plurality of time delayed signals;
    (d) filtering the third signal to pass a first filtered signal of frequency substantially equal to the shift frequency and filtering the fourth signal to pass a second filtered signal of frequency substantially equal to the shift frequency;
    (e) combining the first and second filtered signals to produce a detector signal;
    (f) producing a threshold signal in response to the incoming signal;
    (g) producing a report signal when the detector signal exceeds the threshold signal.

25. The method according to claim 24 wherein the successive time delays correspond in retrograde seriatim to the known sequence of successive intervals.

26. An apparatus for detecting the presence in an incoming signal of a frequency shift keyed signal of known shift frequency, key rate, and key period that comprises
    (a) first means for time delaying the incoming signal by a first time interval and for providing a first time delayed signal;
    (b) first means for multiplying the incoming signal by the first time delayed signal to produce a first product;
    (c) first means for filtering the first product to pass a first filtered signal of frequency substantially equal to the shift frequency;
    (d) means for producing a threshold signal in response to the incoming signal;
    (e) means for producing a report signal when the first filtered signal exceeds the threshold signal.

27. The apparatus according to claim 26 wherein the first time delaying means is adapted to produce a time delay substantially equal to an odd multiple of the key period.

28. The apparatus according to claim 26 wherein the first filtering means comprises a bandpass filter having a pass band centered substantially at the shift frequency.

29. The apparatus according to claim 26 wherein the first filtering means comprises a bandpass filter whose pass band is substantially of width equal to the key rate.

30. The apparatus according to claim 26 that further comprises first means for producing an integrated signal in response to said incoming signal.

31. The apparatus according to claim 26 that further comprises first means for demodulating the first filtered signal to produce a first demodulated signal.

32. The apparatus according to claim 31 wherein the first demodulating means comprises means for envelope detecting the first filtered signal.

33. An apparatus for detecting a coherent frequency shift keyed signal of a known finite duration, as recited in claim 26 wherein the first filtering means comprises a bandpass filter whose pass band is a width substantially equal to the reciprocal of the finite duration.

34. An apparatus for detecting a frequency shift keyed signal of a known finite duration, as recited in claim 26 that further comprises means for integrating the first filtered signal over an interval substantially equal to the finite duration.

35. The apparatus according to claim 26 wherein the means for producing a threshold signal comprises
    (a) second means for time delaying the incoming signal by a second time interval and for providing a second time delayed signal;
    (b) second means for multiplying the incoming signal by the second time delayed signal to produce a second product;
    (c) second means for filtering the second product to pass a second filtered signal of frequency substantially equal to the shift frequency;
    (d) providing a threshold signal in response to the second filtered signal.

36. The apparatus according to claim 35 further comprising third means for time delaying the second filtered signal by a third time interval.

37. An apparatus for detecting a frequency shift keyed signal of a known finite duration, according to claim 36, wherein the third time delaying means is adapted to produce a delay greater than the finite duration.

38. The apparatus according to claim 35 wherein said second time delaying means is adapted to produce a delay substantially equal to an even multiple of the key period.

39. The apparatus according to claim 35 wherein the second filtering means comprises a bandpass filter having a pass band centered at the shift frequency.

40. The apparatus according to claim 35 wherein the second filtering means comprises a bandpass filter whose pass band is substantially of width equal to the key rate.

41. The apparatus according to claim 35 that further comprises second means for producing an integrated signal in response to said incoming signal.

42. The apparatus according to claim 35 that further comprises second means for demodulating the second filtered signal.

43. The apparatus according to claim 42 wherein the second demodulating means comprises second means for envelope detecting the second filtered signal.

44. An apparatus for detecting a frequency shift keyed signal of a known finite duration, according to claim 35, that further comprises second means for integrating the second filtered signal over an interval substantially equal to the finite duration.

45. An apparatus for detecting a coherent frequency shift keyed signal of a known finite duration, according to claim 35 wherein the second filtering means comprises a bandpass filter whose pass band is a width substantially equal to the reciprocal of the finite duration.

46. An apparatus for detecting a frequency shift keyed signal of a known finite duration according to claim 35 wherein the second time delaying means is adapted to produce a delay greater than the finite duration.

47. An apparatus for detecting the presence of a frequency shift keyed signal in an incoming signal which includes an intermittent pair of continuous wave signals separated in frequency by the frequency shift, according to claim 26 wherein the means for producing a threshold signal comprises a means for producing a binary threshold signal having a first state when the incoming signal does not include the pair of continuous wave signals, and having a second state when the incoming signal includes the pair of continuous wave signals.

48. The apparatus according to claim 26 further comprising means for comparing the first filtered signal with the threshold signal to produce a comparison signal and means for performing binary integration on the comparison signal.

49. An apparatus for detecting the presence in an incoming signal of a coded frequency shift keyed signal having a known shift frequency and alternating in a known sequence of successive intervals comprising
  (a) means for sequentially delaying the incoming signal by a plurality of successive time delays to produce a plurality of time delayed signals, including a first delayed signal and a second delayed signal;
  (b) means for multiplying the first delayed signal by the second delayed signal to produce a third signal;
  (c) means responsive to the successive time delays for producing a fourth signal;
  (d) means for filtering the third signal to pass a first filtered signal of frequency substantially equal to the shift frequency and means for filtering the fourth signal to pass a second filtered signal substantially equal to the shift frequency;
  (e) means for combining the first and second filtered signals to produce a detector signal;
  (f) means for producing a threshold signal in response to the incoming signal;
  (g) means for producing a report signal when the detector signal exceeds the threshold signal.

50. The apparatus according to claim 49 wherein the successive time delays correspond in retrograde seriatim to the known sequence of successive intervals.

* * * * *